July 31, 1956

G. PAGNARD 2,757,063

TIMEKEEPING APPARATUS WITH PRINTED TIMES

Filed Nov. 20, 1951

INVENTOR
Georges Pagnard
BY
Edward T. Connors
ATTORNEY

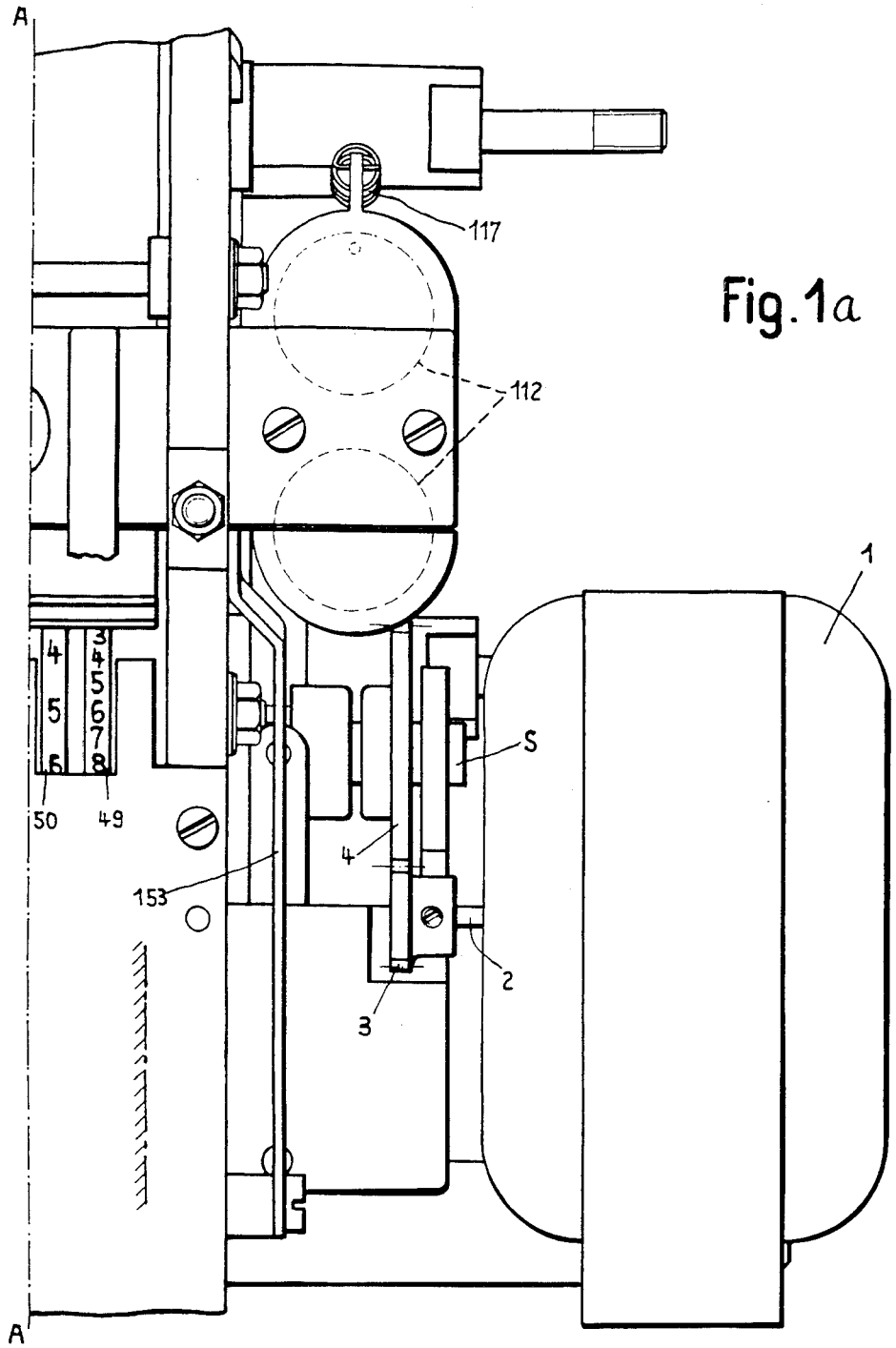

July 31, 1956  G. PAGNARD  2,757,063
TIMEKEEPING APPARATUS WITH PRINTED TIMES
Filed Nov. 20, 1951  14 Sheets-Sheet 3

INVENTOR
GEORGES PAGNARD
BY Edward V. Connors
ATTORNEY

July 31, 1956 G. PAGNARD 2,757,063
TIMEKEEPING APPARATUS WITH PRINTED TIMES
Filed Nov. 20, 1951 14 Sheets-Sheet 4

INVENTOR
Georges Pagnard
BY
Edward P. Connors
ATTORNEY

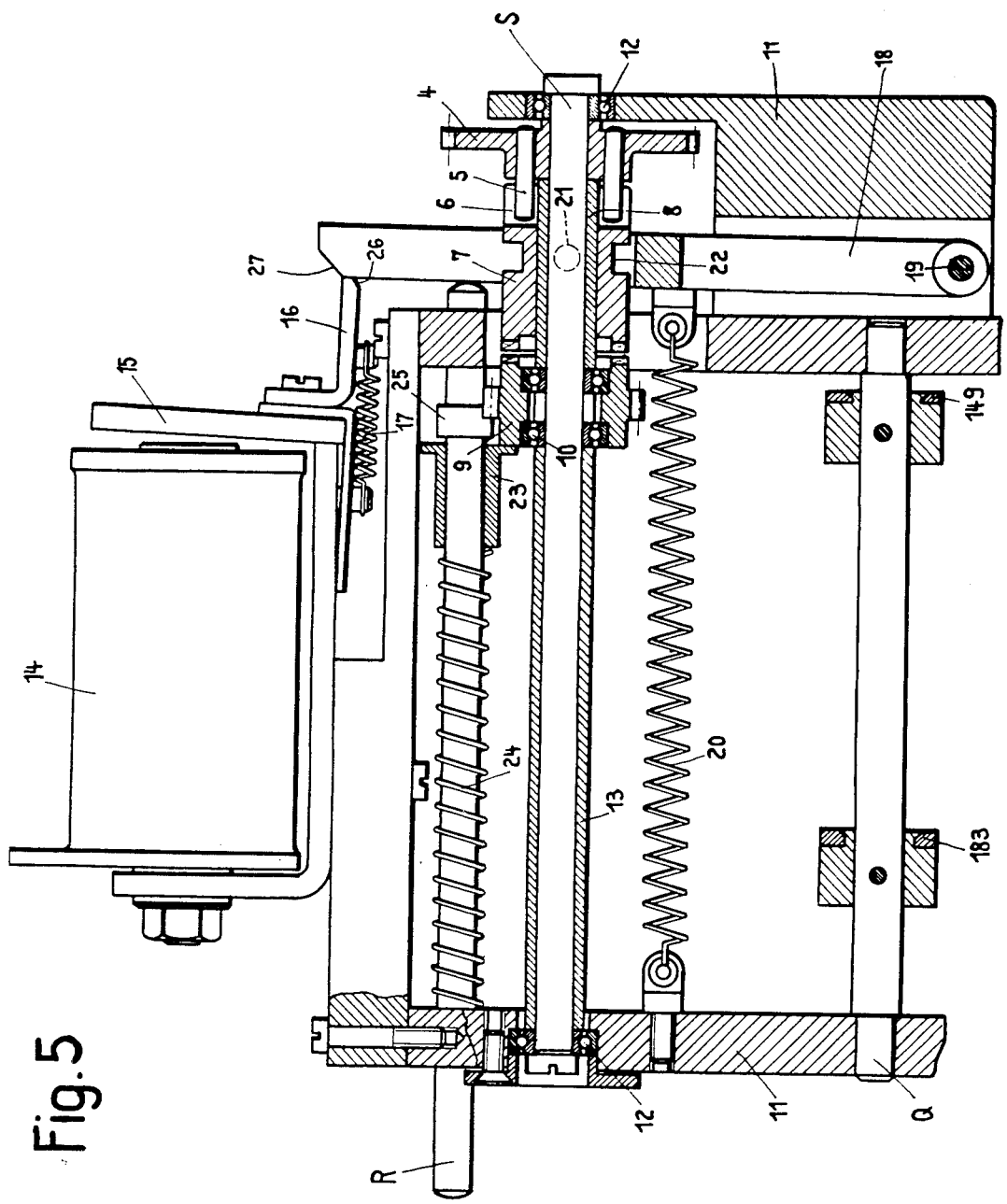

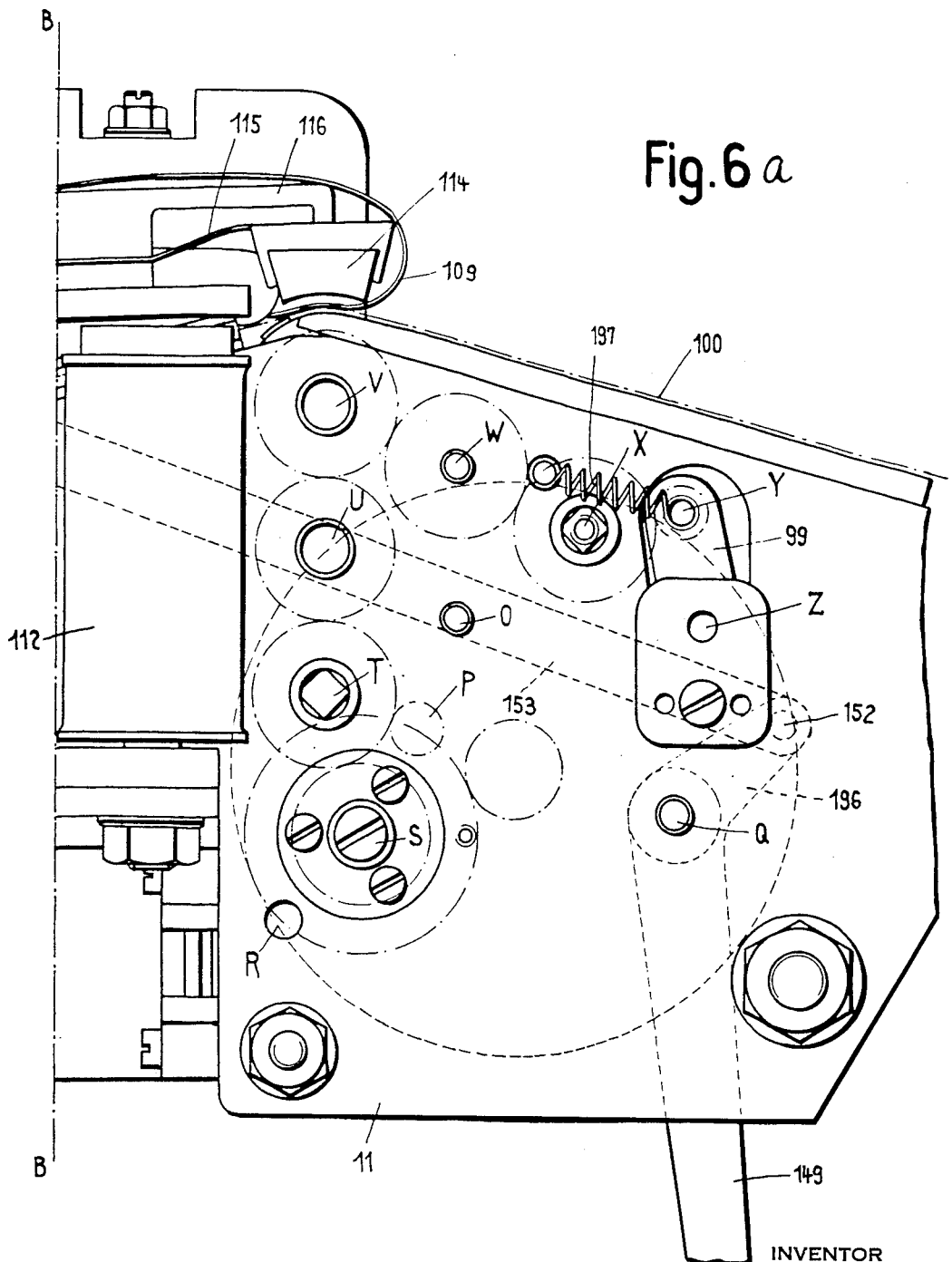

July 31, 1956  G. PAGNARD  2,757,063
TIMEKEEPING APPARATUS WITH PRINTED TIMES
Filed Nov. 20, 1951  14 Sheets-Sheet 8

INVENTOR
Georges Pagnard
BY
Edward V. Connors
ATTORNEY

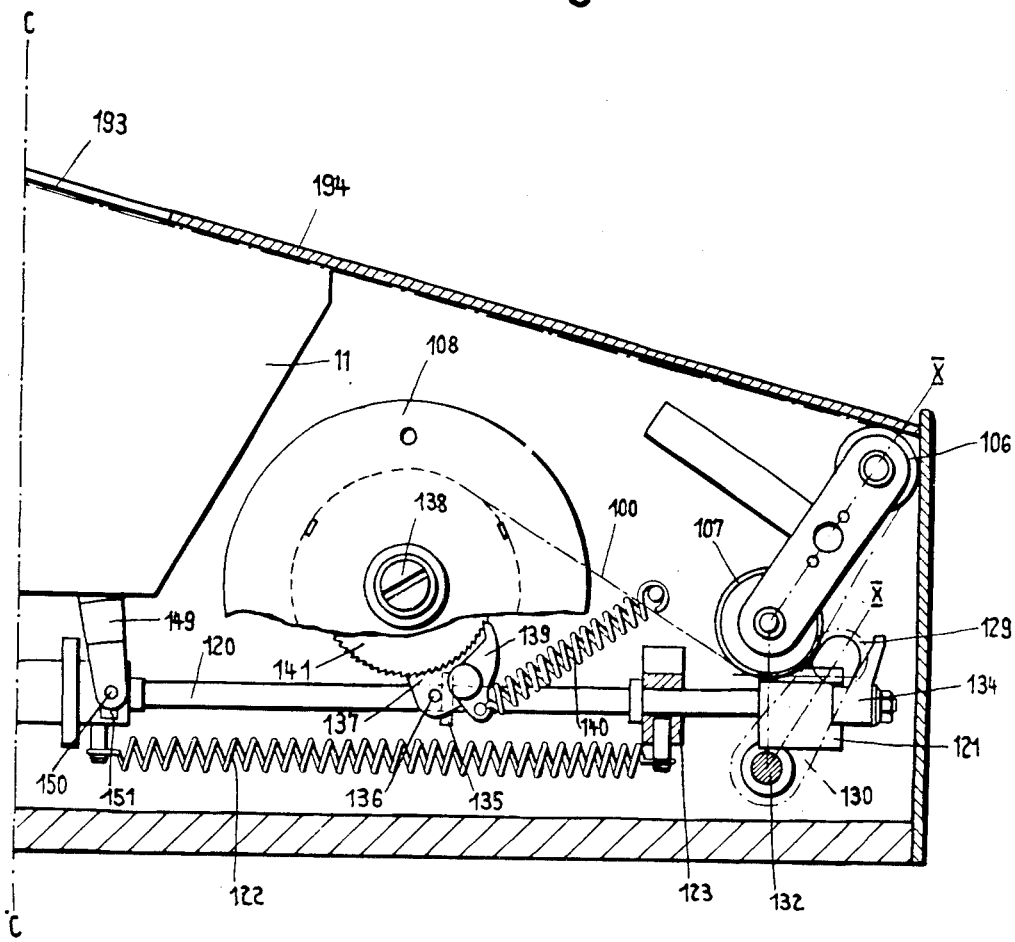

July 31, 1956  G. PAGNARD  2,757,063
TIMEKEEPING APPARATUS WITH PRINTED TIMES
Filed Nov. 20, 1951  14 Sheets-Sheet 10

INVENTOR
Georges Pagnard
BY
Edward T. Connors
ATTORNEY

July 31, 1956

G. PAGNARD 2,757,063

TIMEKEEPING APPARATUS WITH PRINTED TIMES

Filed Nov. 20, 1951

INVENTOR
Georges Pagnard
BY
Edward T. Connors
ATTORNEY

July 31, 1956  G. PAGNARD  2,757,063
TIMEKEEPING APPARATUS WITH PRINTED TIMES
Filed Nov. 20, 1951  14 Sheets-Sheet 12

INVENTOR
Georges Pagnard
BY
Edward P. Connors
ATTORNEY

July 31, 1956  G. PAGNARD  2,757,063
TIMEKEEPING APPARATUS WITH PRINTED TIMES
Filed Nov. 20, 1951  14 Sheets-Sheet 13
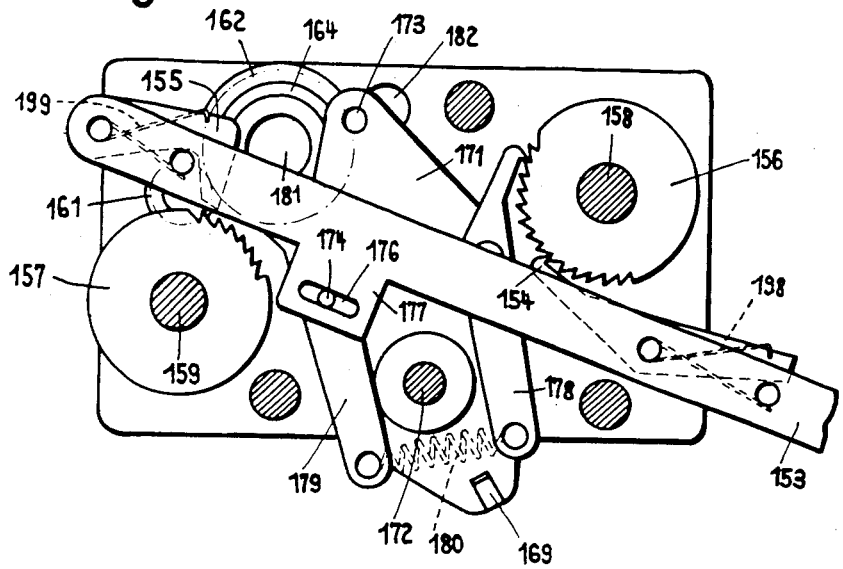
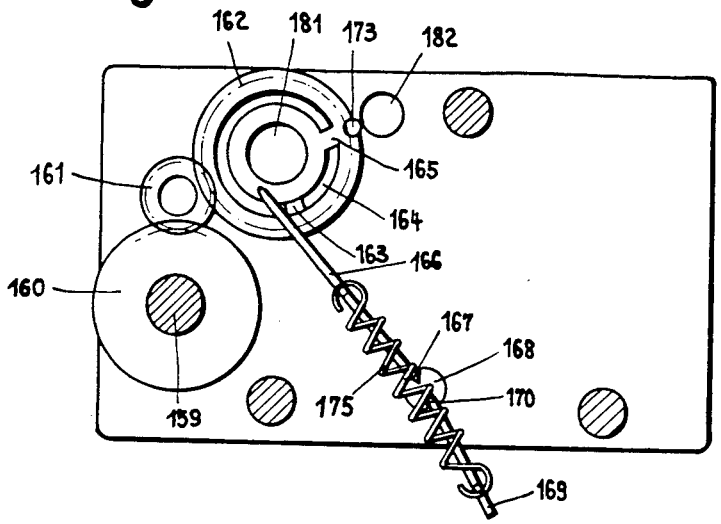
INVENTOR
Georges Pagnard
BY Edward T. Connors
ATTORNEY July 31, 1956  G. PAGNARD  2,757,063
TIMEKEEPING APPARATUS WITH PRINTED TIMES
Filed Nov. 20, 1951  14 Sheets-Sheet 14

INVENTOR
Georges Pagnard
BY
Edward T. Connors
ATTORNEY

United States Patent Office 2,757,063
Patented July 31, 1956

2,757,063

TIMEKEEPING APPARATUS WITH PRINTED TIMES

Georges Pagnard, Moutier, Switzerland, assignor to Omega Louis Brandt & Frere S. A., Bienne, Switzerland Application November 20, 1951, Serial No. 257,250

Claims priority, application Switzerland May 5, 1951

6 Claims. (Cl. 346—91)

The present invention relates to a time-keeping apparatus in which indications of lengths of timed intervals are printed.

Time-keeping apparatus with time registering means are already known, and which include printing drums driven by a motor which is synchronized at fixed intervals by a chronometer having electric contacts. This synchronization is very delicate and does not permit the registration of the timed intervals with the desired accuracy, for instance with a precision of a hundredth of a second.

On the other hand in the printing devices used up to the present the accuracy is reduced because of the very variable reaction times of the levers and also because of the considerable weight of the drums bearing the numerals.

There are also known other types of apparatus in which the timed intervals are registered on a film by a photographic process, but the development of the images necessitates the use of intricate and cumbersome equipment. In addition the results cannot be obtained immediately.

The present invention aims to overcome these drawbacks by providing a device to register timed intervals with the precision required by the strictest regulations, the indications of the timed intervals being obtained immediately.

The apparatus according to the invention includes a mechanical counter having graduated drums, which is driven by a synchronous motor controlled by a high-frequency precision clock.

An embodiment of the invention will now be further described by way of example with reference to the accompanying drawings, in which:

Figures 1 and 1a taken together are a plan view of the whole apparatus.

Fig. 5 is a horizontal cross-sectional view through the axis of the coupling shaft of the gearing driving the time drums.

Figure 6:
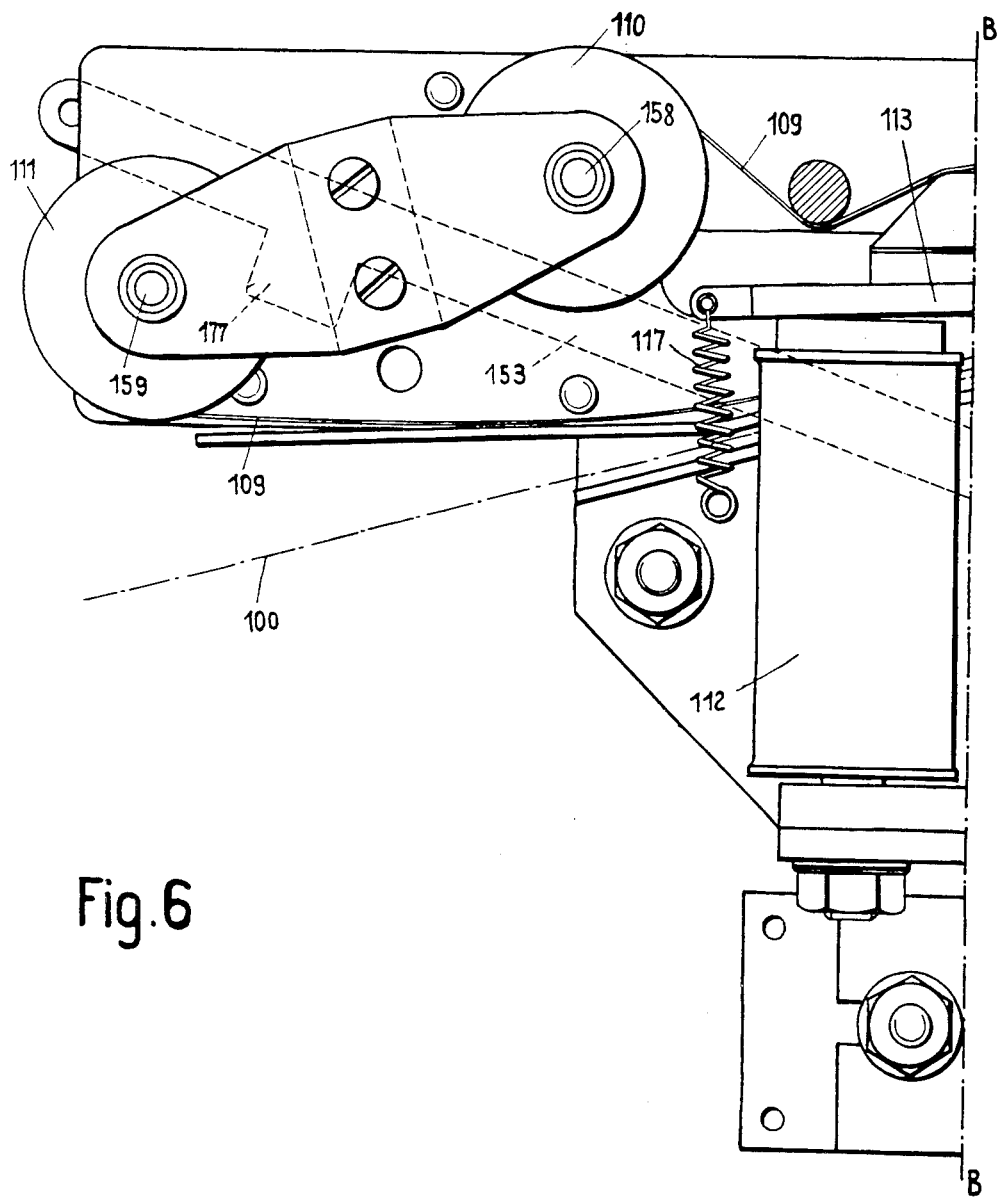

Figs. 6 and 6a taken together are an elevation view of the striker mechanism and inking device.

Figure 7:
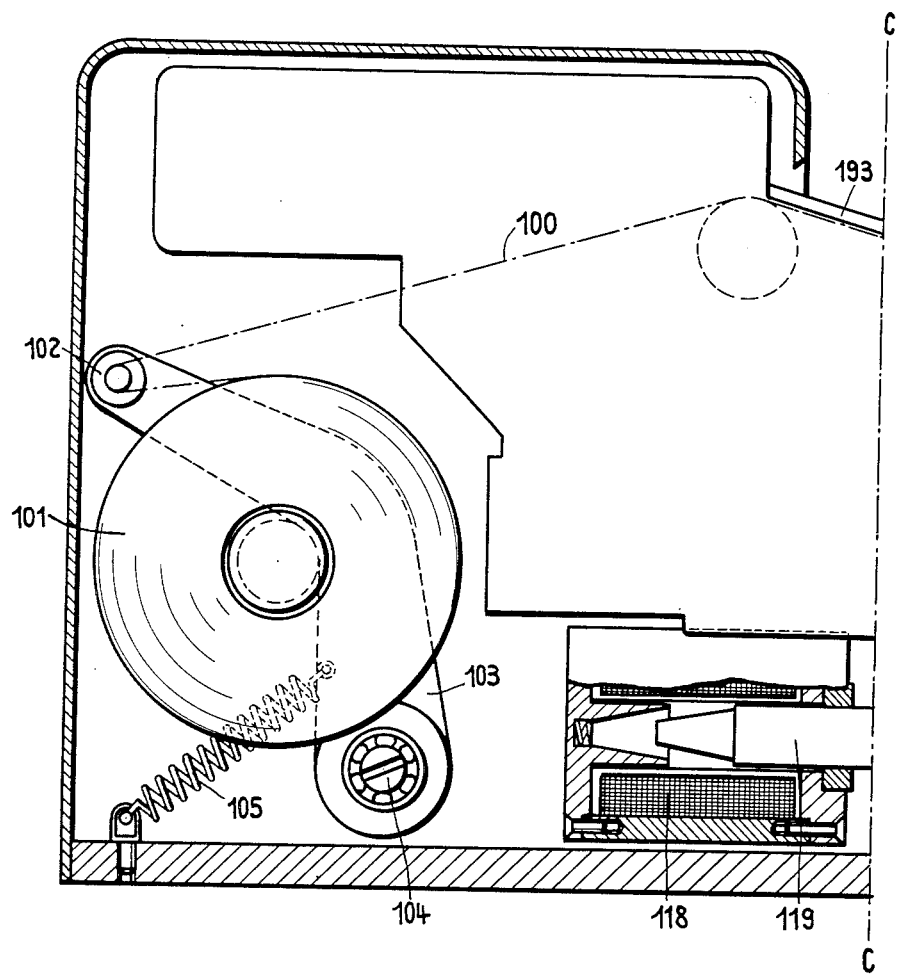

Figs. 7 and 7a taken together are an elevation view, partially in section, of the control mechanism for advancing the paper strip, inking ribbon and titalizator.

Figure 8:
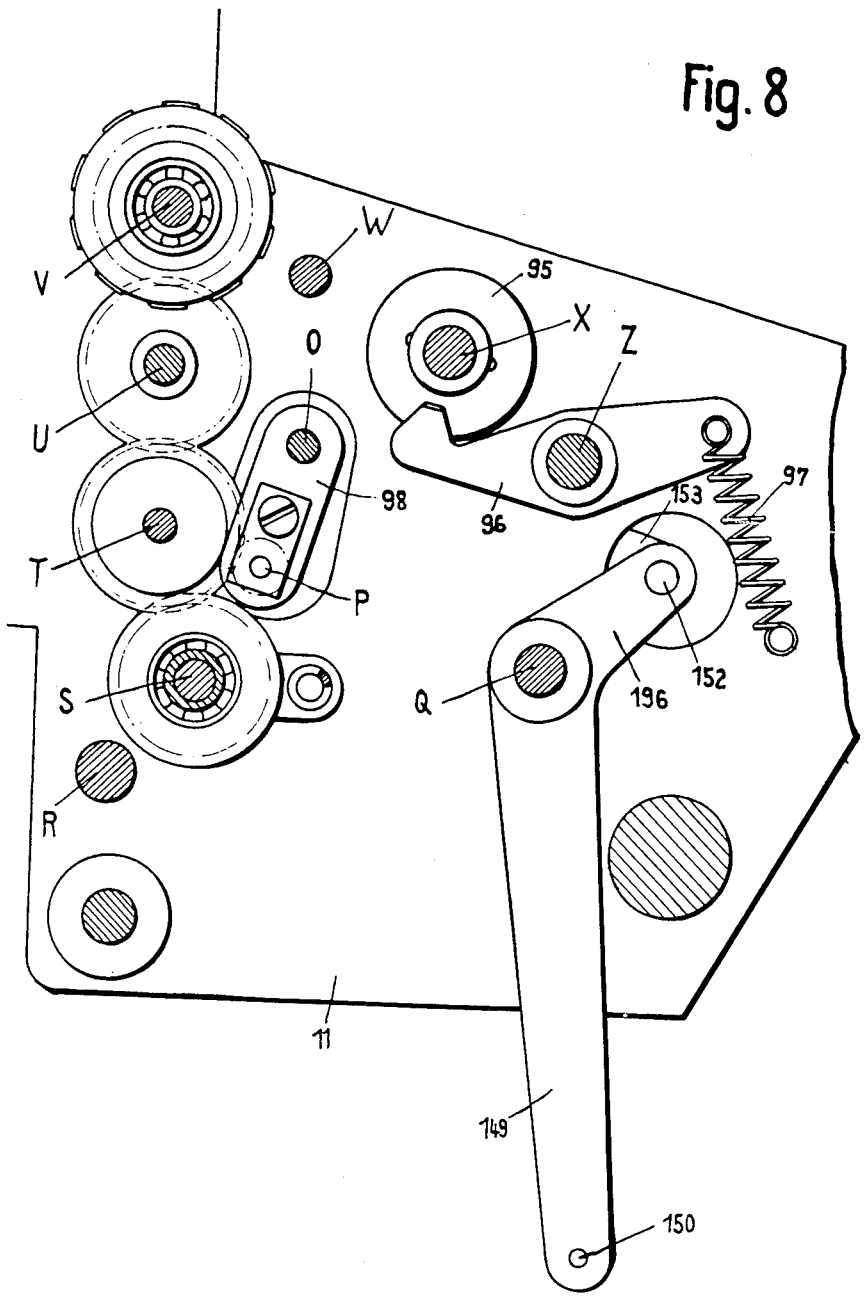

Fig. 8 is a vertical cross-sectional view through the axis of the counter drums and the axes of the gearing of the time drums.

Figure 9:
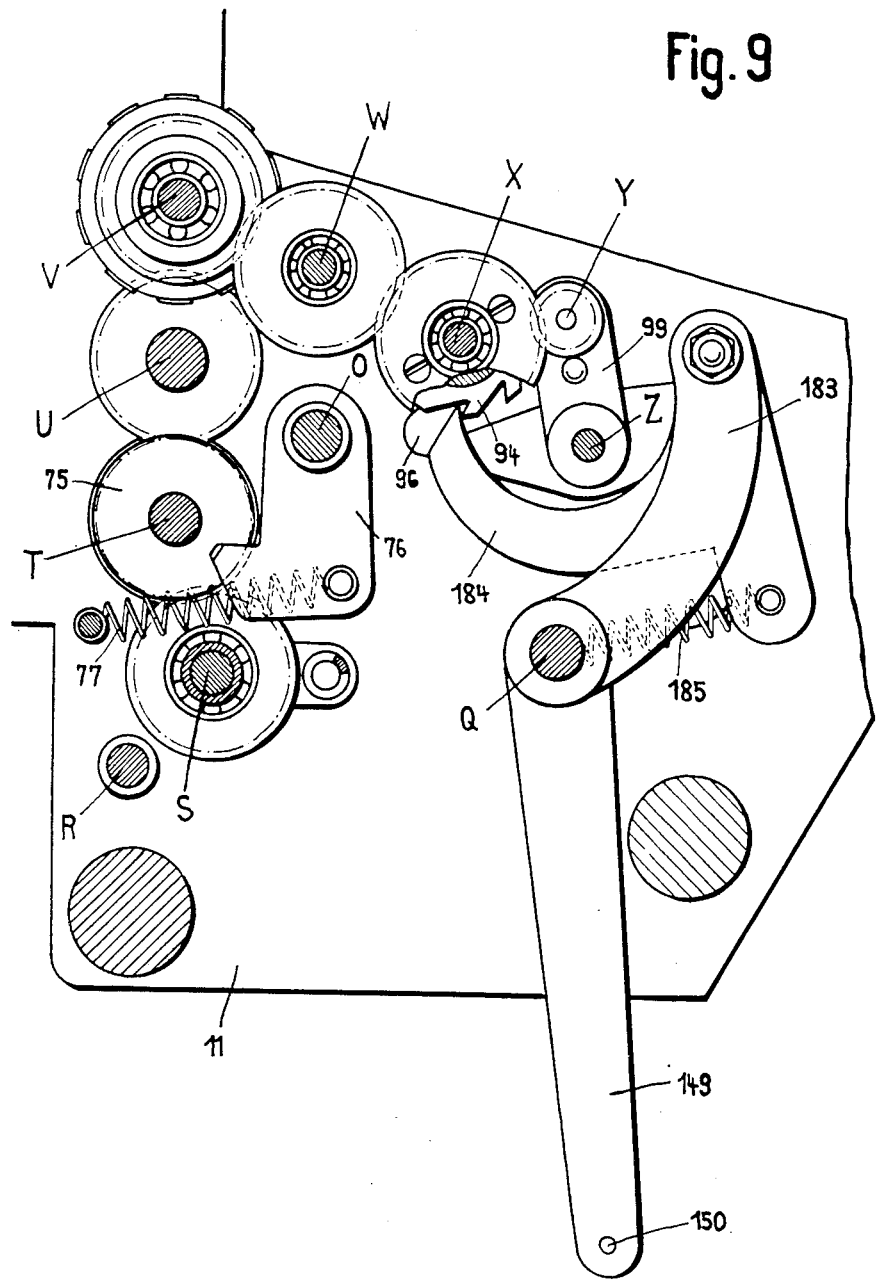

Fig. 9 is a vertical cross-sectional view through the axis of the counter drums and the axes of the gearing of the totalizator drums.

Figure 10:
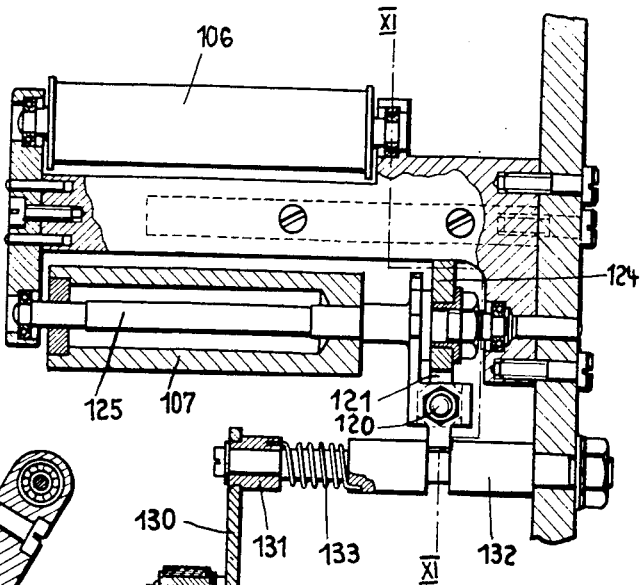

Fig. 10 is a cross-sectional view taken along the line X—X of Fig. 7.

Figure 11:
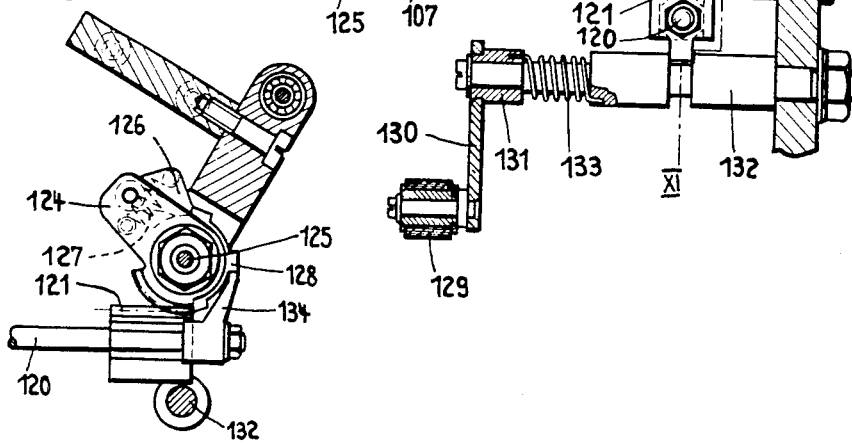

Fig. 11 is a cross-sectional view taken along the line XI—XI of Fig. 10.

Figure 12:
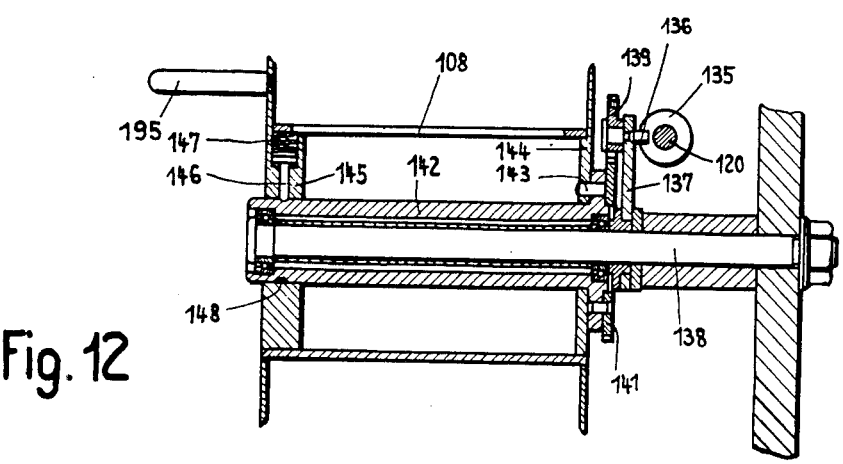

Fig. 12 is an axial sectional view of the reel receiving the printed strip of paper.

Fig. 13 is a cross-sectional view of a portion of the control device for the inking ribbon.

Fig. 14 shows another detail of the control device for the inking ribbon.

Figure 15:
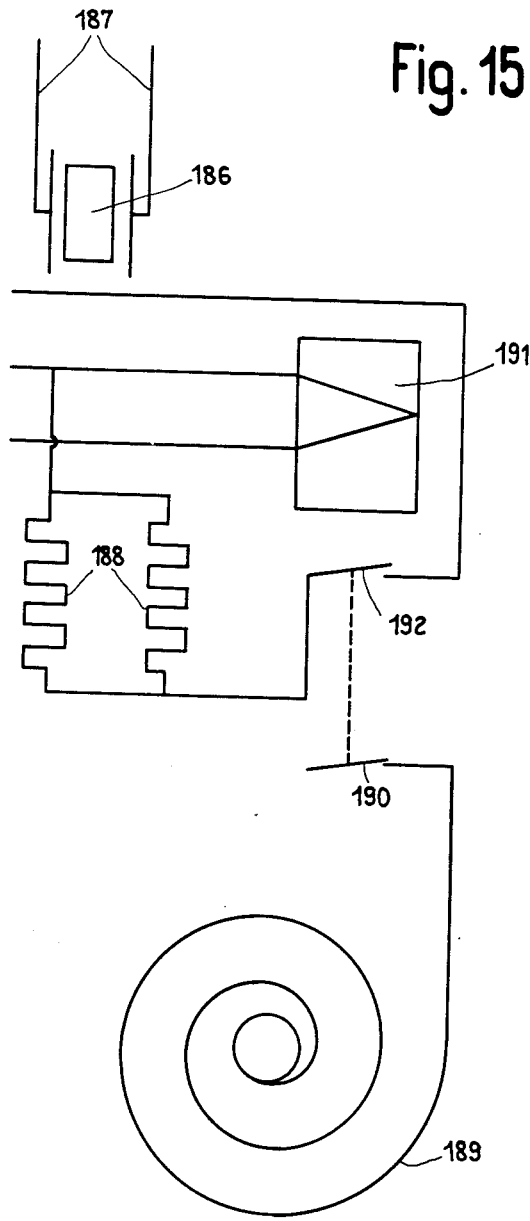

Fig. 15 shows the connection diagram of the thermostat adapted to constantly maintain the temperature of the enclosure containing the quartz crystal of the precision clock.

The apparatus hereinafter described is for the purpose of printing on a paper strip indications of timed intervals, measured in hours, minutes, second and hundredths of a second, such as the departures passages or arrivals of the racers of athletic meetings, ski, cycling, or road races in circuit for cars or motorcycles, etc. The races are started by a pistol provided with a contact, cut wire or photo-electric cell, whereas the passages or arrivals of the participants are signalled by the breaking of a wire or by a photo-electric cell. In the case of several racers arriving substantially at the same time a special plug permits the actuation of a camera provided with an electromagnetic shutter-release at the moment of the passage of the racers.

The apparatus comprises substantially:

(1) A precision clock formed by a quartz clock;
(2) A synchronous motor controlled by said quartz clock;
(3) A mechanical counter having: (a) a set of time drums driven by the synchronous motor through the intermediary of a coupling device and of a gearing; (b) a set of drums forming a totalizator and giving the number of registrations;
(4) A resetting-to-zero device for the counter drums;
(5) A paper strip passing over the counter drums;
(6) A striker mechanism adapted to produce a printing on the paper strip;
(7) An inking device with a ribbon, and
(8) A control mechanism for advancing the paper strip, inking ribbon and totalizator.

The precision clock is a quartz clock (not shown) whose output stage delivers an alternating current of 50 cycles per second. This clock controls a synchronous motor 1 (Fig. 1) running at 1500 revolutions a minute.

On the shaft 2 of the motor 1 is fixed a toothed wheel 3 meshing with a toothed wheel 4 rigidly locked with the coupling shaft S. In the wheel 4 are set two pins 5 (Fig. 5) freely engaged in slots 6 of a member 7 which can slide on a sleeve 8 pressed on the shaft S. The member 7 forms, together with a toothed wheel 9, a claw coupling provided with very small gullet teeth. The wheel 9 is rotatably mounted on the shaft S by means of a ball-bearing 10. The shaft S, rotated by the wheel 4 at a speed of 300 revolutions per minute, turns in the walls of a frame 11 by means of ball-bearings 12. A sleeve 13, pressed on the shaft S, and the sleeve 8 secure the axial position of the ball-bearings 10, 12 and of the wheel 4.

The wheel 9 serves to drive the time drums through the intermediary of a gearing described below. An electromagnet 14 (Fig. 5) is adapted to engage the claw coupling 7, 9 at the precise moment of the beginning of the time to be measured, and has an armature 15 fixed to a angle-iron 16 which is under the influence of a return-spring 17. The angle-iron 16 cooperates with a lever 18 pivoting at 19 and subjected to the action of a coil-spring 20 fixed to the frame 11. The lever 18 carries a pin 21 freely engaged in a groove 22 provided on the member 7.

A shaft R slidable axially in the frame 11 bears with one of its ends against the lever 18. A brake 23, formed by a sleeve sliding on the shaft R, is pressed by a spring 24 against the wheel 9 in order to prevent any rotation of the latter as long as the claw coupling 7, 9 is not engaged.

At the beginning of the time to be measured a current impulse is supplied to the electromagnet 14 and attracts the armature 15 with its angle-iron 16. The released lever 18 is attracted by the spring 20 and pushes the member 7 to the left (Fig. 5) by means of the pin 21, so that the members 7 and 9 engage one another. Simultaneously the lever 18 repulses the shaft R to the left, so that the collar 25, fixed to this shaft, releases the brake 23 and permits the wheel 9 to transmit to the time drums the rotation of the wheel 4 and of the member 7. The uncoupling is obtained by pushing the shaft R to the right (Fig. 5). The angle-iron 16 and the lever 18 have on their ends two oblique faces 26, 27 respectively, which serve to prevent the armature 15 from coming back to its position of rest until the shaft R is moved to the right. A contact (not shown), actuated by the armature 15 and connected in series with the coil of the electromagnet 14, prevents a new impulse from reaching the coil until the armature is reset. This arrangement acts to save current.

Figure 2:
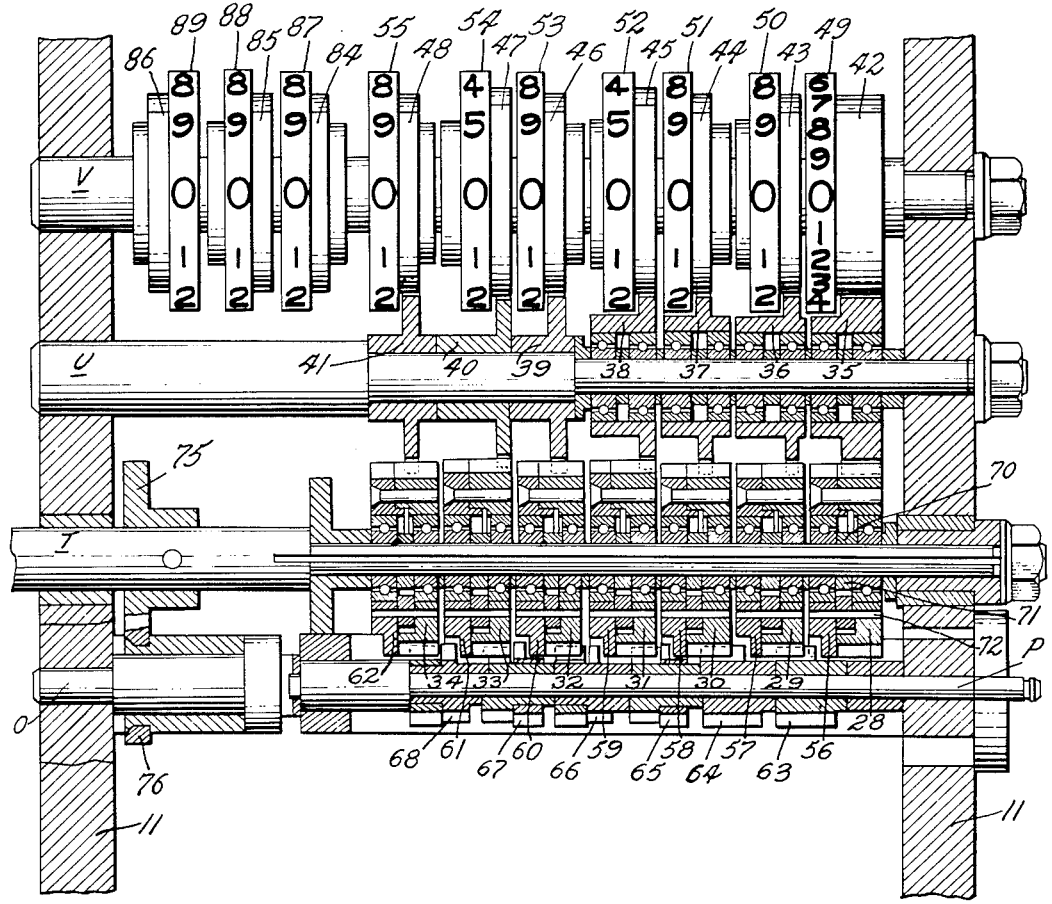
Fig. 2 is an elevation view of the counter device with the gearing for the time drums in axial cross-section.

The toothed wheel 9 meshes with a wheel 28 on the shaft T (Fig. 2). The wheel 28 is the first wheel of a set of control wheels 28 to 34 which are freely pivoted on the shaft T by means of ball-bearings. The wheels 28 to 34 each engage one of the intermediate wheels 35 to 41 freely mounted on the shaft U. The wheels 35 to 41 each mesh in turn with one of the wheels 42 to 48 carrying the time drums 49 to 55. The wheels 42 to 48 are freely mounted on the shaft V.

The time drums 49 to 55 bear relief numerals on their periphery, to wit:

| Number of the drum | Indication | Graduation |
| --- | --- | --- |
| 49 | hundredths of a second | twice 0 to 9. |
| 50 | tenths of a second | once 0 to 9. |
| 51 | seconds | once 0 to 9. |
| 52 | tens of seconds | twice 0 to 5. |
| 53 | minutes | once 0 to 9. |
| 54 | tens of minutes | twice 0 to 5. |
| 55 | hours | once 0 to 9. |

Each drum-holder wheel has the same diameter and the same number of teeth as the corresponding control wheel.

The wheel 28, which is driven by the wheel 9, transmits its movement to the intermediate wheel 35 and to the wheel 42, and therefore also to the drum 49 registering in hundredths of a second. A special device is provided in order to transmit the movement of the wheel 28 to the other control wheels 29 to 34. To each of the control wheels 28 to 34 is fixed one of the members 56 to 62 on each of which only a portion of the circumference is milled. The members 57, 58, 60 and 62 have only two teeth adjacent each other, whereas the members 56, 59 and 61 have two groups of two teeth, which are diametrally opposed to each other. The members 56 to 61 are adapted to drive transmission wheels 63 to 68, rotatably mounted on the shaft P and meshing in turn with the control wheels 29 to 34 respectively. With this arrangement, when the drum 49 is making a half-turn (corresponding to 10 hundredths of a second), the wheel 28 makes a half-turn owing to the equality of the diameters of the wheels 28 and 42, and the member 56 turns by two teeth the transmission wheel 63 which in turn rotates by two teeth the control wheel 29, this corresponding to the unit marked on the drum 50, that is a tenth of a second. When the drum 50 has made a complete revolution (=10 tenths of a second), the member 57 which has only two teeth will drive in the same manner the transmission wheel 64 which will turn the wheel 30 by two teeth, so that the seconds drum 51 will be turned by one division. The movement of the drums is transmitted in the same manner to the hour drum 55.

It will be observed that the two wheels 31 and 33 have a greater diameter than the other control wheels. They have 24 teeth instead of 20, for they correspond to the drums which are graduated twice from 0 to 5.

The time drums are in motion during the whole duration of the time measurement.

Figure 4:
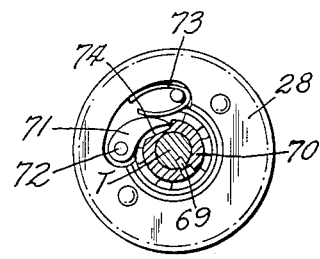
Fig. 4 is a cross-sectional view of the resetting-to-zero device for the drums of the counter.

The resetting-to-zero of the drums is made by means of the shaft T. The latter has a groove in which is engaged the stud-pin 69 of the members 70. Fig. 4 shows the resetting-to-zore mechanism for the wheel 28; an identical mechanism is arranged for the other control wheels. A pawl 71 pivoting at 72 on the wheel 28 is pressed against the member 70 by a spring 73 accommodated in a recess of the wheel 28. A notch 74 is cut out in the member 70. When the shaft T is being turned by one revolution in the same direction as the normal rotation of the wheels (counter-clockwise direction, Fig. 4), the nose of the pawl 71 eventually falls in the notch 74, and the member 70 drives the wheel 28 and therefore the corresponding drum 49.

A cam 75 mounted on the shaft T (Fig. 2), in which falls a lever 76 under the action of its spring 77 (see also Fig. 9), determines the end of the rotation. At this moment all the naughts of the time drums are on the same line (position shown in Fig. 2). The shaft R already mentioned, which operates to uncouple the counter through the intermediary of the lever 18, also serves to brake, by means of the member 23, the hundredths of a second drum 49, which tends to go too far on the resetting-to-zero operation.

Figure 1:
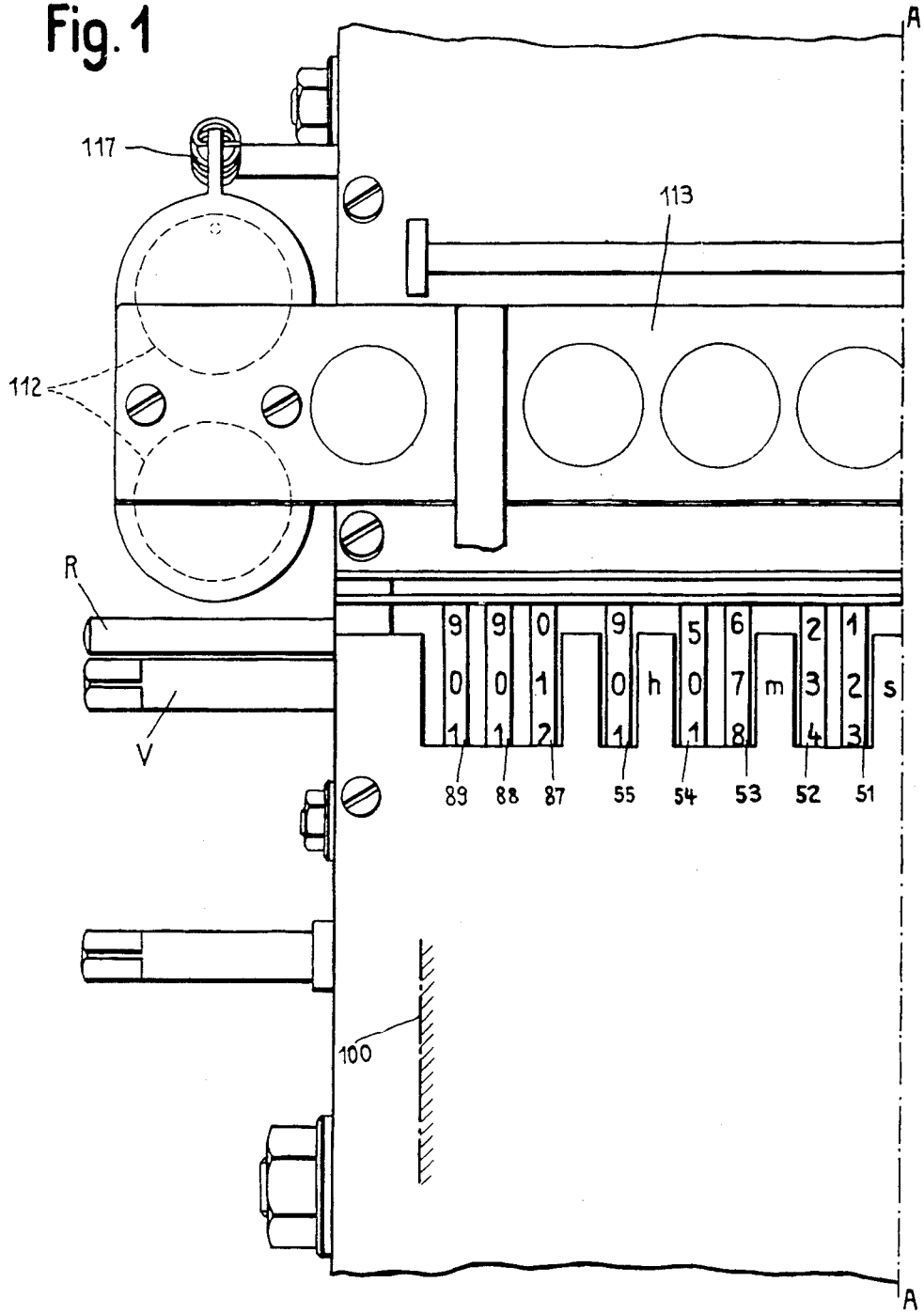
Figure 3:
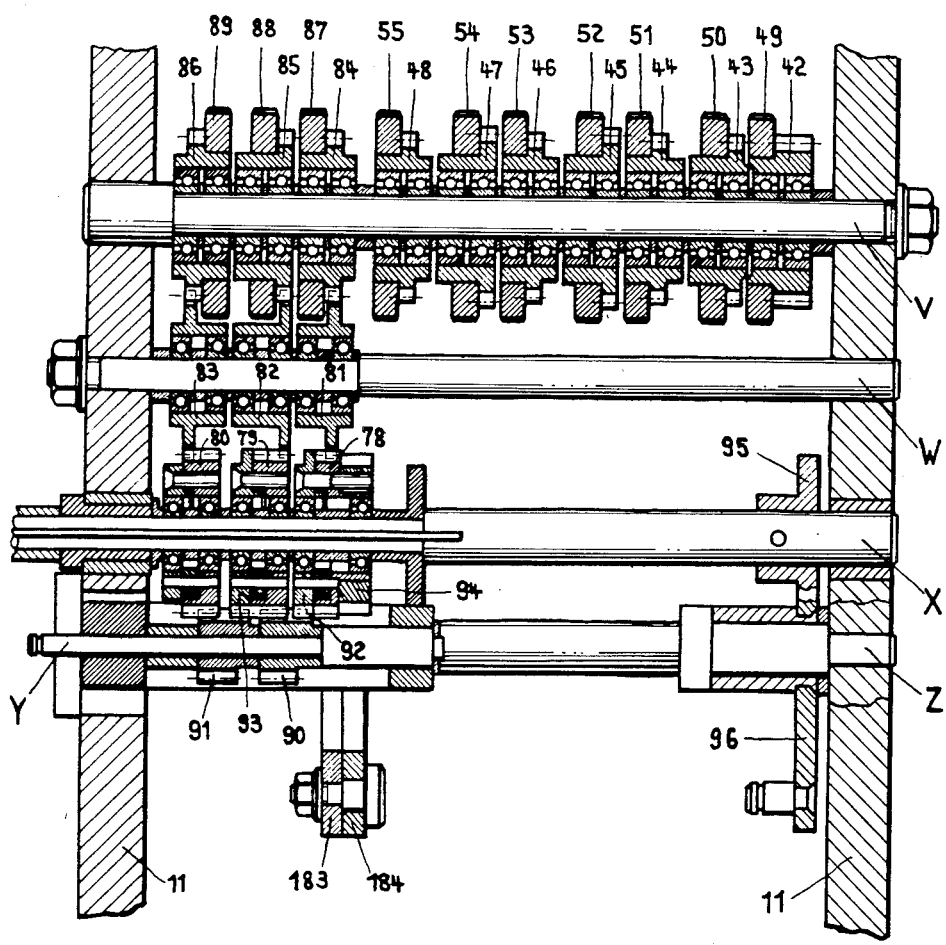
Fig. 3 is a cross-sectional elevation view of the counter device, showing the gearing for the drums of the totalizator.

A totalizator, shown in Figs. 1 to 3, is adapted to indicate the number of the registrations. Its mechanism is similar to that of the time drums. It comprises (see Fig. 3) three control wheels 78 to 80 freely mounted on the shaft X, three intermediate wheels 81 to 83 freely mounted on the shaft W, and three wheels 84 to 86 carrying the drums 87 to 89 respectively, indicating the units, the tens and the hundreds. The drum-holder wheels 84 to 86 are freely mounted on the shaft V and are therefore coaxial with the drum-holder wheels 42 to 48 of the time counter. Two transmission wheels 90, 91, freely mounted on the shaft Y, cooperate on the one hand with members 92, 93 fixed to the wheels 78, 79 and having a group of two teeth, the remaining portion of their circumference being unmilled, and on the other hand with the control wheels 79 and 80 respectively. The first control wheel 78, is rigidly locked with an operating wheel 94 which is driven, after each registration, by a mechanism described below.

The resetting-to-zero of the totalizator drums is made by the shaft X in a similar way to that shown in Fig. 4 for the drums of the time counter. A cam 95, mounted on the shaft X (Fig. 3), in which falls a lever 96 under the action of its spring 97 (see also Fig. 8), determines the end of the rotation. At this moment all the totalizator drums are marking naught (position shown in Fig. 2).

Figs. 6, 8 and 9 show the arrangement of the several shafts which all are carried by the frame 11, except the shafts P and Y carrying the transmission wheels of the drums. The shaft P (Fig. 8) is mounted on two straps 98 pivoting about the shaft O, and a spring (not shown) tends to rotate said straps in the clockwise direction as seen in Fig. 8. This arrangement aims at freeing the control wheels from the engagement with the transmission wheels and permitting the resetting-to-zero. In a similar way the shaft Y (Figs. 6 and 9) is mounted on two straps 99 pivoting about the shaft Z, and a spring 197 tends to rotate said straps in the counterclockwise direction as seen in Figs. 6 and 9.

The registration is made on a paper strip 100 (Fig. 7). Numeral 101 denotes a supply roll from which the paper strip 100 unrolls. The strip 100 passes at first on a tension roller 102 carried by a lever 103 pivoting at 104 under the action of a spring 105. The strip 100 then passes on the drums of the counter (top of Fig. 7), on rollers 106, 107 and is wound on a reel 108 adapted to receive the printed paper strip. The paper feed mechanism will be described hereinafter.

An inking ribbon 109 is provided in the upper portion of the apparatus (Fig. 6). It passes alternately from the spool 110 to the spool 111 and vice versa. The mechanism controlling the advancing movement of the inking ribbon as well as its reversing gear will be described below.

The printing on the paper strip 100 is produced by means of a striker mechanism. The latter comprises four coils 112 (Figs. 1 and 6) whose common armature 113 is attracted by a current impulse arriving at the apparatus at the precise instant of a time to be registered. A striker 114, formed by a mass of metal, is secured to this armature 113 by two springs 115. Stops 116 are adapted to limit the upward movement of the springs 115. The striker is arranged above the counter drums, the inking ribbon 109 being placed between the striker 114 and the paper strip 100.

When a current impulse arrives in the coils 112, the armature 113 is suddenly attracted and drives the striker 114. When the armature 113 stops on the coils, the striker, owing to its inertia, continues its travel and causes the springs 115 to bend and prints the relief of the drums on the paper strip 100. Under the influence of the springs 115 and 117 the armature 113 is brought back into its position of rest. The striking is extremely rapid and lasts less than one thousandth of a second.

An electromagnet 118 (Fig. 7) serves to effect three functions:

(1) Feeding of the paper strip,
(2) Feeding of the inking ribbon,
(3) Actuation of the totalizator.

These three operations take place immediately after the striking, for instance 0.05 second afterwards.

The electromagnet 118 includes a core 119 to which is fixed a rod 120 terminating in a toothed rack 121. A coil-spring 122 fixed on the one hand to the core 119 and, on the other hand, to a stationary guiding member 123 traversed by the rod 120, tends to draw the core 119 out of the electromagnet 118, so that in the absence of a current impulse in the coil of this electromagnet the core has the position shown in Fig. 7. In Fig. 11 the position of the parts corresponds to the case where the core 119 is attracted. The rack 121 engages a toothed sector 124 (Figs. 10 and 11) freely mounted on the shaft 125 of the roller 107. A pawl 126 pivoting on the sector 124 and subjected to the action of a spring 127 cooperates with a ratchet wheel 128 locked on the shaft 125. A bearing roller 129 maintains the paper in contact with the roller 107 which is knurled. To this end the roller 129 is held at the extremity of a lever 130 fixed to a sleeve 131 freely mounted on the shaft 132. A torsion spring 133 fixed on the one hand to the shaft 132 and on the other hand to the sleeve 131 constantly tends to rotate the lever 130 in the counterclockwise direction as may be seen in Fig. 7.

When the core 119 is attracted by the electromagnet 118 the rod 120 moves to the left (Fig. 7) with its rack 121. The latter turns the sector 124 in the clockwise direction as seen in Fig. 11, so that the pawl 126 rotates the ratchet wheel 128 and therefore the roller 107 which is also locked on the shaft 125 (see Fig. 10). When the rod 120 comes to the end of its travel (position shown in Fig. 11), a tooth of the ratchet wheel 128 strikes against a stop 134 fixed to the end of the rod 120, thus limiting with precision the angle of rotation of the ratchet wheel.

When the current impulse ceases in the electromagnet 118 the spring 122 brings back the core 119 into its position of rest or retracted position. The toothed sector 124 turns in the counterclockwise direction and the pawl 127 slides over the teeth of the ratchet wheel 128 without driving the latter.

When once the preceding operation has taken place the paper strip 100 has become slack between the roller 107 and the reel 108. It is thus also necessary to turn the reel 108. For this purpose the rod 120 has a collar 135 adapted to cooperate with a pin 136 set in a lever 137 freely pivoting on the shaft 138 of the reel 108. The lever 137 carries a pawl 139 maintained by a spring 140 in engagement with a ratchet wheel 141. The latter is locked with a hub 142 freely mounted on the shaft 138 (Fig. 12). A pin 143 fixed to the wheel 141 is engaged in an opening of one of the side plates 144 of the reel 108 whose other side plate 145 has a chamber accommodating a rod 146 pushed radially by a spring 147 into a groove 148 of the hub 142. The pin 143 serves to drive the reel 108, whereas the rod 146 maintains in axial direction the reel 108 on the hub 142. A crank-handle 195 fixed to the reel 108 is for its rotation by hand and to take it out of the apparatus.

When the core 119 is attracted by the electromagnet 118, the collar 135 moves to the left (Fig. 7) and drives the lever 137 through the intermediary of the pin 136, thereby stressing the spring 140. During this movement the pawl 139 glides on the wheel 141. When the rod 120 comes back to its position of rest under the action of its return-spring 122, the lever 137 is likewise brought back by its spring 140. The pawl 139 compels the ratchet wheel 141 to turn in the counterclockwise direction (Fig. 7) so that the paper strip is wound on the reel 108. As the idle stroke of the lever 137 is greater than necessary the latter does not return to its first position as the taut paper strip prevents it. This arrangement avoids any risk of the paper being torn owing to an excessive tension.

The means by which the inking ribbon is advanced immediately after each printing operation will now be explained and also how its displacement direction is automatically reversed.

A lever 149 pivoting about the shaft Q (Figs. 8 and 9) has at its free end a pin 150 which is engaged in an opening 151 of the core 119 (Fig. 7), so that on the reciprocating motions of said core the lever 149 oscillates about the shaft Q. On the latter is fixed a lever 196 which is linked at 152 with a rod 153 (Figs. 6, 8 and 13). This rod carries two driving pawls 154 and 155, which are subjected to the influence of springs 198 and 199 respectively and are adapted to actuate the ratchet wheels 156 and 157 alternately. These wheels 156 and 157 are rigidly locked with the shafts 158, 159 of the spools 110, 111 so that, if the wheel 156 is rotated (as in Fig. 13), the inking ribbon 109 is wound on the spool 110 and is unwound from the spool 111.

A gear 160 (Fig. 14) secured to the shaft 159 is milled only on a portion of its circumference and has for instance only two teeth engaging on each revolution a pinion 161 which in turn meshes with a wheel 162. The latter carries a catch 163 and has a projecting ring 164 broken by an opening 165. The catch 163 is adapted to cooperate with a fork member 166 terminating in a knife-edge 167 engaged in a notch of a stud 168.

A second fork member 169 also terminates in a knife-edge 170 engaged in a second notch of the stud 168. This member 169 is locked with a plate 171 (Fig. 13) pivoted at 172 and carrying two pins 173 and 174. A coil-spring 175 is fixed to the ends of the fork members 166 and 169 opposite to the knife-edges 167 and 170, and tends to rock these members by holding their ends together against the stud 168 which is coaxial with the shaft 172. The pin 174 is engaged in a groove 176 provided in a lug 177 of the rod 153. Two retaining pawls 178, 179 which are pivoted on the plate 171 and which are connected with one another by a spring 180 are adapted to cooperate with the wheels 156, 157.

Immediately after the striking operation the core 119 is attracted by the electromagnet 118 so that the lever 149 moves to the left (Fig. 7) and drives the rod 153 to the right (Fig. 13). In the position shown in Fig. 13 the driving pawl 154 engages the wheel 156 and drives the spool 110, the inking ribbon 109 being unwound from the spool 111. The latter turns in the counterclockwise direction (Fig. 13) and drives the wheels 160 and 162 in the same direction. After one revolution the catch 163 will bear against the fork member 166 on the other side and will rock it. After a small additional displacement of the wheel 162 the pin 173 will pass through the opening 165 of the wheel 162 and come up against the shaft 181 thereby driving the plate 171. The latter, oscillating about its pivot 172 in the counterclockwise direction (Fig. 13), drives the rod 153 by means of its pin 174. The rod 153 turns somewhat about its pivot 152 and the pawls 155 and 179 come into engagement with the wheel 157, whereas the pawls 154 and 178 move away from the wheel 156. The reciprocating motion of the rod 153 thus provokes the advancing movement of the inking ribbon 109 in the other direction, i. e. from the spool 110 to the spool 111.

After a certain number of revolutions of the spool 111 in the clockwise direction (Fig. 13) and the wheel 162 having made one revolution in the same direction, the catch 163 will come again to bear against the fork member 166 and will rock it so that said member comes back into the position shown in Fig. 14. As soon as the pin 173 is opposite the opening 165, it will be released, thus rocking the plate 171 in the clockwise direction (Fig. 13) and coming up against a stop member 182. The plate 171 has thus again taken the position shown in Fig. 13 and the inking ribbon again winds on the spool 110.

The third function of the electromagnet 118 is the actuation of the totalizator. To this end on the shaft Q of the lever 149 is fixed (Fig. 9) a lever 183 on the end of which pivots a pawl 184 subjected to the action of a spring 185. The nose of the pawl 184 engages the teeth of the operating wheel 94 (see also Fig. 3). Thus, every time the core 119 is attracted, the lever 149 moves to the left (Fig. 9) and drives the lever 183 in the clockwise direction, so that the pawl 184 moves by one tooth the wheel 94 which has 10 teeth. Through the intermediary of the gearing 78, 81 and 84, the unit drum 87 of the totalizator is thus turned by one division. The totalizator therefore indicates the total number of the registrations on the paper strip.

The quartz clock will not be described in detail. Only the thermostat adapted to keep constant the temperature of the enclosure containing the quartz crystal exhibits certain peculiarities which are explained hereinafter. This thermostat is shown in Fig. 15. The quartz crystal 186 is connected to the quartz clock through wires 187. The heating is produced by two heating bodies 188 connected in parallel. The temperature regulator is formed by a bimetallic strip 189 which is wound spirally. When the temperature rises the spiral closes and its free end comes behind a feeler 190. The latter is controlled by the coil 191 which receives periodically current impulses.

As long as the temperature is less than that for which the bimetallic strip 189 is adjusted, the contact 192, rigidly locked with the feeler 190, can close, but when the prescribed temperature is reached, the end of the strip 189 prevents the feeler 190 from coming back to its position of rest. The contact 192 is held open so that current cannot flow in the heating bodies 188. When the temperature decreases below the prescribed value, the bimetallic strip 189 opens again and allows the feeler 190, and therefore the contact 192, to return into its position of rest, so that the heating takes place again.

The general operation of the apparatus described results from the preceding description. Generally the coupling of the time drums, by means of the claw coupling 7, 9, is effected at the precise instant of the beginning of the time interval to be measured. It is now evident that this coupling operation involves a certain delay or time-lag, between the moment when the current impulse is flowing through the electromagnet 14 and the moment when the drums begin to turn, that is, a small time $t_1$ elapses. On the other hand, the striking operation offers also a small delay, namely the time $t_2$ elapsing between the moment when the current impulse is flowing through the coils 112 and the moment when the striker 114 produces the printing on the paper strip. It is possible to make these two delays $t_1$ and $t_2$ equal to each other because of the fact that the spring 20 of the lever 18 (Fig. 5) is adjustable. It is thus possible to change the reaction time $t_1$ of the coupling operation.

By reason of the arrangement above described it is possible to directly register absolute time intervals, this being especially interesting for the timing of records. When used for the timing of races with spaced starting, it is evident that the absolute time can be obtained only for the first racer. In this case the counter should be started a moment before the beginning of the race, so that only the reaction time $t_2$ of the striking operation is intervening. The accuracy of the construction of the apparatus ensures that this time $t_2$ remains absolutely constant during the events of the meeting.

The arrangement described of the counter drums affords the advantage of being compact while permitting the printing on the paper strip. An aperture 193 made in the cover 194 of the apparatus (Fig. 7) permits the reading of the printing immediately after the striking, thereby constituting a great advantage over the known devices with photographic registration, in which one must wait several seconds for developing the film.

The speed of the drums of the time counter has been chosen slow enough, and the striking rapid enough, as to that the slight braking effect produced by the striking would not alter the measurements by a greater error than the desired precision. The apparatus such as described and shown permits to register the times with full accuracy with a precision of a hundredth of a second.

What I claim is:

1. A high precision time recording device for time measurements accurate to one one-hundredth of a second comprising a plurality of timing drums calibrated in units respectively indicating hundredths of a second, seconds, minutes and hours, precision quartz clock controlled alternating current driving means, a first shaft-mounted toothed wheel in driven engagement with the quartz clock controlled driving means, a second shaft-mounted toothed wheel in driving engagement with the timing drums, a first electrical relay including an armature operative to engage the first and second toothed wheels at the start of a time interval, first spring holding means to maintain the toothed wheels in engagement, a recorder strip in juxtaposition to the timing drums, a striker to impact the recorder strip against the timing drums for marking thereby, a second spring carrying the striker and normally spacing the striker from the recording means, a second electrical relay including an armature to move the striker towards the recorder strip, first stop means for the first relay armature, the striker by its inertia and the action of the spring and upon contact of the first relay armature with the first stop means adapted to contact the recorder strip and impact it against the timing drums in marking contact upon energization of the second relay, the duration of the marking contact against the timing drums being of the order of one one-thousandth of a second, second stop means carried by the first relay armature blocking the first and second toothed wheels from engagement, the second stop means movable away from blocking position upon energization of the first relay, and adjustment means for the first spring operable to adjust the operating time of the first relay to correspond with the operating time for the striker so that the starting time of rotation of the time drums is adjusted to correspond with the lag of the striker in impacting the recorder strip against the timing drums, whereby upon one or more later actuations of the second relay a time measurement is recorded automatically corrected for striker time lag.

2. A high precision time recording device for time measurements accurate to one one-hundredth of a second comprising at least one timing drum, timing drum driving means, coupling means between the driving means and the timing drum, a first electrical relay including an armature operative to engage the coupling means at the start of a time interval, first spring holding means to maintain the coupling means in engagement, a recorder strip in juxtaposition to the timing drum, a striker to impact the recorder strip against the timing drum for marking thereby, a second spring carrying the striker and normally spacing the striker from the recording means, a second electrical relay including an armature to move the striker towards the recorder strip, first stop means for the first relay armature, the striker by its inertia and the action of the spring and upon contact of the first relay armature with the first stop means adapted to contact the recorder strip and impact it against the timing drum in marking contact upon energization of the second relay, the duration of the marking contact against the timing drum being of the order of one one-thousandth of a second, second stop means carried by the first relay armature blocking the coupling means from engagement, the second stop means movable away from blocking position upon energization of the first relay, and adjustment means for the first spring operable to adjust the operating time of the first relay to correspond with the operating time for the striker so that the starting time of rotation of the time drum is adjusted to correspond with the lag of the striker in impacting the recorder strip against the timing drum, whereby upon one or more later actuations of the second relay a time measurement is recorded automatically corrected for striker time lag.

3. A high precision time recording device for time measurements accurate to one one-hundredth of a second comprising at least one timing drum, timing drum driving means, coupling means between the driving means and the timing drum operative at the start of a time interval, first spring holding means to maintain the coupling means in engagement, a recorder strip in juxtaposition to the timing drum, a striker to impact the recorder strip against the timing drum for marking thereby, a second spring carrying the striker and normally spacing the striker from the timing means, striker operating means to move the striker towards the recorder strip, stop means for the striker operating means, the striker by its inertia and the action of the spring and upon contact of the striker operating means with the stop means adapted to contact the recorder strip and impact it against the timing drum in marking contact, the duration of the marking contact against the timing drum being of the order of one one-thousandth of a second, and adjustment means for the first spring operable to adjust the operating time of the coupling means to correspond with the operating time for the striker so that the starting time of rotation of the time drums is adjusted to correspond with the lag of the striker in impacting the recorder strip against the timing drum, whereby upon one or more later actuations of the striker operating means a time measurement is recorded automatically corrected for striker time lag.

4. A high precision time recording device for time measurements accurate to one one-hundredths of a second comprising timing means, driving means, coupling means between the timing means and its driving means operative at the start of a time interval, recording means, a striker to impact the recorder strip against the timing means for marking thereby, spring means carrying the striker and normally spacing the striker from the timing means, striker operating means to move the striker towards the recorder means, stop means for the striker operating means, the striker by its inertia and the action of the spring and upon contact of the striker operating means with the stop means adapted to contact the recorder means and impact it against the timing means in marking contact, the duration of the marking contact being of the order of one one-thousandth of a second, and adjustment means for the coupling means operating time to match it with the operating time for the striker so that the starting time of the timing means is adjusted to correspond with the lag of the striker in impacting the recorder strip against the timing means, whereby upon one or more later actuations of the striker operating means a time measurement is recorded automatically corrected for striker time lag.

5. A high precision time recording device comprising timing means, starting means for the timing means, recording means, striker means to impact the recording means against the timing means in marking relationship, spring means carrying the striker and normally maintaining the striker in non-marking position, striker operating means to set the striker in motion, stop means for the striker operating means, the striker by its inertia and upon contact of the striker operating means with the stop means adapted to impact the recorder means against the timing means in marking contact, and spring adjustment means for the starting of the timing means correcting for the striker lag.

6. A time recording device comprising timing means, starting means for the timing means, recording means, striker means to impact the recording means against the timing means in marking relationship, spring means carrying the striker and normally maintaining the striker in non-marking position, striker operating means to set the striker in motion, the striker by its inertia, adapted to impact the recorder means against the timing means in marking contact, and adjustment means for the starting of the timing means correcting for the inherent striker lag.

References Cited in the file of this patent

UNITED STATES PATENTS

| | | |
|---|---|---|
| 876,776 | Degenhardt | Jan. 14, 1908 |
| 912,230 | Cottrill et al. | Feb. 9, 1909 |
| 1,761,050 | Redmond et al. | June 3, 1930 |
| 2,019,301 | Friden | Oct. 29, 1935 |
| 2,219,636 | Schwartz | Oct. 29, 1940 |
| 2,540,033 | Leathers | Jan. 30, 1951 |
| 2,555,198 | Laurent | May 29, 1951 |

FOREIGN PATENTS

| | | |
|---|---|---|
| 65,727 | Austria | July 25, 1914 |